Patented Apr. 11, 1933

1,903,573

UNITED STATES PATENT OFFICE

WILLI SCHULTZE, OF HALLE-ON-THE-SAALE, GERMANY

DISTILLATION PROCESS

No Drawing. Application filed October 23, 1929, Serial No. 401,956, and in Germany October 10, 1928.

This invention relates to a process for the distillation of organic evaporable substances of the wood-rosin type. The new process is characterized by the fact that products of the highest value are obtained in maximum yield since the distillation material is subjected to the distillation in smallest quantity in a minimum of time. The effect is obtained by limiting at the same time the temperature of evaporation and the operative pressure to a minimum whilst, on the other hand, maintaining the evaporation surface at a maximum, and thereby the velocity of evaporation reaches its maximum.

The process may be assisted by preliminarily heating the distillation material before the distillation nearly up to the temperature which is to be maintained during the distillation process.

The process is suitable for use with all substances amenable to distillation and can be used with particular success in the case of those initial substances containing constituents which, in the known processes, are either passed into by-products of inferior quality or which diminish the quality of the distillate.

In the case of the distillation of crude oil, for example, conditions somewhat as follows are to be observed. The crude oil is preliminarily heated to about 100°, it flows in a thin stream on to a surface preliminarily heated to 230° and spreads out on this latter into a layer of 3 mm. thickness. The pressure in the apparatus is maintained at less than 1 mm. of mercury. The distillation material now vaporizes, in so far as it is vaporizable at all, in a few minutes and separates hereby into material which is vaporizable and material which is not vaporizable under these conditions. The further treatment of the vaporized constituents and of the non-vaporizable constituents is effected in the usual manner (with or without application of fractionating columns, and so forth).

Examples

Example 1.—If it is desired to separate red-brown to ruby-red resin obtained by the extraction of dead wood (wood rosin) into bright coloured valuable resin and into dark coloured, but very high melting, resin, conditions somewhat as follows are to be observed.

The wood rosin preliminarily heated to about 200° C. flows in a thin stream on to a surface preliminarily heated to 255° C. and spreads itself out on this in a layer of about 3 mm. thickness.

The pressure in the apparatus is maintained at less than 1 mm. of mercury.

Under these conditions, the bright-resin portion vaporizes in about 8 minutes, and distills into a condenser with a vapour temperature of about 225–235° C., whereas the hard-resin portion which is non-vaporizable under these conditions flows off continuously into a collecting vessel.

The yield of bright-resin amounts to 83% and of hard resin 16%.

The "dropping point" (Ubbelohde) of the bright-yellow resin produced is 75° C., its "acid number" 170° and its unsaponifiable content 8.3%. By "dropping point" is here understood the state during the distillation in which the distillate begins the condensation by forming drops. By "acid number" is understood the number of the acid, that is, in the analysis of oils and fats and free acids, the quantity of potassium hydroxide in milligram necessary for the saturation of the free acids in one gram substance.

The hard resin has a "dropping point" (Ubbelohde) of 131° C., an "acid number" of 117 and an unsaponifiable content of 9.5%.

The initial material used, wood rosin, was red-brown, had a "dropping point" of 76° C., an "acid number" of 151 and an unsaponifiable content of 7.1%.

Example 2.—If it is desired to obtain from talloel which is a mixture in varying quantities of resin acids, fatty acids and unsaponifiable material, fatty acids which are as poor as possible in resin acids, the procedure is somewhat as follows:

The talloel, containing 36% resinic acid and 6.3% unsaponifiable material, preliminarily heated to about 180° C., flows in a thin stream on to a surface preliminarily heated to 240° C. and spreads itself out on this in a layer of about 4 mm. thick.

The pressure in the apparatus is less than 1 mm. of mercury.

The main quantity of the fatty acids and a part of the unsaponifiable material vaporize in about 7 minutes during passage over the heated surfaces and distill with a vapour temperature of about 190–198° C. through a fractionation head into a condenser, whereas the resin-like acids and acids of similar boiling point to the resin acids, non-vaporizable under these conditions, flow away continuously through a cooler into a collecting vessel.

A yield of, for example, 42% fatty acid distillate having a resin acid content of 4.5% and an unsaponifiable content of 4.2% is obtained, whereas 57% of non-vaporized deodorized talloel, rich in resin acid, is obtained.

*Example 3.*—If it is desired to separate fatty acids from neutral fats one proceeds somewhat as follows:

Earth nut oil of 10% fatty acid content, preliminarily heated to about 180° C., flows in a thin jet in a continuous stream on to a surface preliminarily heated to about 240° C., and spreads out on this into a layer of about 4 mm. thick.

The pressure inside the apparatus is maintained at less than 1 mm. of mercury.

The regulation of the supply and withdrawal of the oil is so conducted that the oil is treated about 6–10 minutes. In this time the fatty acids vaporize, continuously distill off and are caught in a condenser, whilst a continuous stream of oil, constantly showing less than 1% of fatty acid, leaves the exit of the apparatus.

*Example 4.*—If it is desired to separate off high-percentage bright coloured fatty acids from technical or preliminarily treated, e. g. split-up wool fats of any composition one proceeds somewhat as follows.

Wool fat (acid number 115) free from water and preliminarily heated to about 185° C., flows in a thin jet in a continuous stream on to a surface preliminarily heated to, and maintained at, about 240° C., and spreads itself out on this surface into a layer of about 4 mm. thickness. The pressure in the apparatus is maintained at less than 1 mm. of mercury.

The regulation of the supply and withdrawal of the fat is so conducted that the wool fat is subjected to the treatment in high vacuum at the said temperature for about 8 minutes.

The greater quantity of the acids, 48%, vaporizes in this time and distills with a vapour temperature of about 195–200° C. through a fractionating column, whereby ill-smelling low boiling constituents of the fatty acids are separated off, into a condenser whilst the high-molecular acids, non-vaporizable under these conditions, and the neutral fat flow away through a cooler into a collecting vessel.

The wool fat, freed from the distilled-off fatty acids and completely odorless, has an acid number of 20.6, it emulsifies with water, and may be worked up by the known methods to bright coloured neutral fat. The fatty acids distilled off are saponifiable to the extent of 97–98%.

What I claim is:

1. A continuous distillation process of organic evaporable substances of the wood rosin type at a pressure of less than 1 mm. of mercury; which process consists of preheating a suitable quantity of the substance to a temperature between 180° and 255° C., then spreading the thus liquefied substance in a thin stream to form a layer 3 to 4 mm. thick on a surface having substantially the same temperature, while maintaining the stated pressure, then after 7 to 10 minutes time collecting the evaporated portion of the substance and condensing the same and simultaneously collecting the non-vaporizable portion of said substance in suitable vessels, thus obtaining a yield of about 83% bright resin and 16% hard resin.

2. A continuous distillation process of organic evaporable substances of the wood-rosin type having an unsaponifiable content of about 7.1% at a pressure of less than 1 mm. of mercury; which process consists of preheating a suitable quantity of the substance to a temperature not over 200° C., causing the substance to flow not over 8 minutes of time in a thin stream over a surface heated to about between 225 and 235° C., thereby spreading it onto a thin layer of about 3 mm. thickness, thus vaporizing a portion of the substances and condensing the same and permitting the non-vaporized resin-like portion to flow away continuously and collecting the same, thus obtaining a yield of about 83% of non-vaporized substances rich in resin and a further yield of about 16% hard resin with a small unsaponifiable content.

In testimony whereof I affix my signature.

WILLI SCHULTZE.